United States Patent
Katchmart

(10) Patent No.: US 10,971,187 B2
(45) Date of Patent: Apr. 6, 2021

(54) CONSTANT-DENSITY WRITING FOR MAGNETIC STORAGE MEDIA

(71) Applicant: Marvell Asia Pte, Ltd., Singapore (SG)

(72) Inventor: Supaket Katchmart, San Jose, CA (US)

(73) Assignee: Marvell Asia PTE, Ltd., Singapore (SG)

(*) Notice: Subject to any disclaimer, the term of this patent is extended or adjusted under 35 U.S.C. 154(b) by 0 days.

(21) Appl. No.: 16/812,960

(22) Filed: Mar. 9, 2020

(65) Prior Publication Data
US 2020/0294549 A1 Sep. 17, 2020

Related U.S. Application Data

(60) Provisional application No. 62/816,760, filed on Mar. 11, 2019.

(51) Int. Cl.
| | |
|---|---|
| G11B 20/12 | (2006.01) |
| G11B 5/09 | (2006.01) |
| G11B 20/14 | (2006.01) |
| G11B 20/10 | (2006.01) |
| G11B 20/18 | (2006.01) |

(52) U.S. Cl.
CPC .......... G11B 20/1258 (2013.01); G11B 5/09 (2013.01); G11B 20/10222 (2013.01); G11B 20/1423 (2013.01); G11B 20/1217 (2013.01); G11B 20/18 (2013.01); G11B 20/1803 (2013.01); G11B 2020/1218 (2013.01)

(58) Field of Classification Search
None
See application file for complete search history.

(56) References Cited

U.S. PATENT DOCUMENTS

| | | | | |
|---|---|---|---|---|
| 5,420,730 A | * | 5/1995 | Moon | G11B 5/5965 360/51 |
| 5,535,067 A | * | 7/1996 | Rooke | G11B 20/1403 327/159 |

(Continued)

FOREIGN PATENT DOCUMENTS

| | | |
|---|---|---|
| JP | 10255402 | 9/1998 |
| JP | 2006031825 | 2/2006 |
| WO | 2020174426 | 9/2020 |

OTHER PUBLICATIONS

"Extended European Search Report", European Application No. 19192790.4, dated Jan. 3, 2020, 7 pages.

(Continued)

*Primary Examiner* — Tan X Dinh

(57) ABSTRACT

The present disclosure describes aspects of constant-density writing for magnetic storage media. In some aspects, a constant-density writer delays transitions between bits within write data to enable constant-density writing. The write data has an initial bit period based on a constant clock signal, which is generated based on the rotation of a media disk. The constant-density writer modifies the write data to generate phase-delayed write data, which has a bit period that is greater than or equal to the initial bit period. To realize this bit period, the constant-density writer changes write phases of bit transitions within the write data. The constant-density writer can also insert stretch bits, filter single-bit transitions, and mitigate glitches within the phase-delayed write data.

20 Claims, 9 Drawing Sheets

(56) References Cited

U.S. PATENT DOCUMENTS

| | | | |
|---|---|---|---|
| 5,636,075 | A | 6/1997 | Nishimura et al. |
| 6,023,386 | A * | 2/2000 | Reed .................. G11B 5/09 |
| | | | 360/46 |
| 6,175,319 | B1 | 1/2001 | Schneider et al. |
| 6,501,610 | B1 * | 12/2002 | Sugawara ............ G11B 5/09 |
| | | | 360/46 |
| 6,574,754 | B1 | 6/2003 | Smith |
| 7,236,911 | B1 | 6/2007 | Gough et al. |
| 8,508,878 | B1 * | 8/2013 | Zou .................. G11B 20/10222 |
| | | | 360/51 |
| 8,508,879 | B1 * | 8/2013 | Zou .................... G11B 5/59616 |
| | | | 360/51 |
| 8,792,197 | B1 * | 7/2014 | Wilson ................ G11B 5/02 |
| | | | 360/46 |
| 8,873,181 | B1 * | 10/2014 | Zou .................... G11B 20/14 |
| | | | 360/51 |
| 8,929,013 | B1 * | 1/2015 | Mastrocola ...... G11B 20/10222 |
| | | | 360/46 |
| 9,530,447 | B2 | 12/2016 | Gao et al. |
| 10,068,609 | B1 | 9/2018 | Mostafa et al. |
| 10,115,415 | B1 | 10/2018 | Tang et al. |
| 10,276,198 | B1 * | 4/2019 | Katchmart ......... G11B 5/59661 |
| 10,734,016 | B2 | 8/2020 | Oberg et al. |
| 2004/0201913 | A1 * | 10/2004 | Sutardja .................. H03L 7/081 |
| | | | 360/51 |
| 2010/0241922 | A1 | 9/2010 | Furuhashi et al. |
| 2014/0244926 | A1 | 8/2014 | Yang et al. |
| 2018/0060192 | A1 | 3/2018 | Eggert et al. |
| 2020/0066299 | A1 | 2/2020 | Oberg et al. |
| 2020/0202893 | A1 * | 6/2020 | Katchmart ......... G11B 20/1024 |
| 2020/0251143 | A1 | 8/2020 | Nangare |
| 2020/0272339 | A1 | 8/2020 | Oberg |
| 2020/0342900 | A1 | 10/2020 | Oberg et al. |

OTHER PUBLICATIONS

"Extended European Search Report", European Application No. 20154549.8, dated Jul. 2, 2020, 6 pages.

"International Search Report and Written Opinion", PCT Application No. PCT/IB2020/051657, dated May 19, 2020, 14 pages.

"International Search Report and Written Opinion", PCT Application No. PCT/US2020/021911, dated Jun. 2, 2020, 13 pages.

"Notice of Allowance", U.S. Appl. No. 16/545,966, dated Mar. 23, 2020, 7 Pages.

"Run-Length Limited", URL: https://en.wikipedia.org/wiki/Run-length_limited, Oct. 18, 2019, 10 pages.

Xu, et al., "Health Status Assessment and Failure Prediction for Hard Drives with Recurrent Neural Networks", IEEE Transactions on Computers, vol. 65, No. 11, Nov. 2016, Nov. 2016, 7 pages.

"International Preliminary Report on Patentability", PCT Application No. PCT/US2020/021911, dated Dec. 3, 2020, 6 pages.

"Notice of Allowance", U.S. Appl. No. 16/928,971, dated Dec. 16, 2020, 8 pages.

* cited by examiner

CONSTANT-DENSITY WRITING FOR MAGNETIC STORAGE MEDIA

CROSS-REFERENCE TO RELATED APPLICATION

This present disclosure claims priority to U.S. Provisional Patent Application Ser. No. 62/816,760 filed Mar. 11, 2019, the disclosure of which is incorporated by reference herein in its entirety.

BACKGROUND

Electronic devices provide many services to modern society. These services enable an electronic device to provide entertainment, assist with scientific research and development, and provide many modern-day conveniences. Many of these services create or use data, which the electronic device stores. This data may include digital media such as books or movies, algorithms that execute complex simulations, personal user data, applications, and so forth. To avoid exceeding data storage limits, it is beneficial to increase the data storage capacity of the electronic device and avoid deleting data, limiting services, or purchasing additional external storage devices.

Many electronic devices use media drives to store data on disks, such as a hard-disk drive. Generally, the data of each disk is organized along concentric tracks of magnetic media in which individual bits of the data are written. To accommodate greater amounts of user data, data densities per media disk have increased substantially, shrinking physical geometries of both the tracks and bits written on the magnetic media. To accommodate greater amounts of user data, it is beneficial to efficiently utilize an area of a media disk.

SUMMARY

This summary is provided to introduce subject matter that is further described in the Detailed Description and Drawings. Accordingly, this Summary should not be used to limit the scope of the claimed subject matter.

This disclosure describes apparatuses and techniques of constant-density writing for magnetic storage media that delay transitions between bits within a data stream. In particular, a constant-density writer accepts write data having an initial bit period based on a fixed clock signal. The clock signal is generated based on the rotation of a media disk. The constant-density writer modifies the write data to generate phase-delayed write data, which has a bit period that is greater than or equal to the initial bit period. To realize the bit period, the constant-density writer changes write phases of bit transitions within the write data. The constant-density writer can also insert stretch bits, filter single-bit transitions, and mitigate glitches within the phase-delayed write data.

In some aspects, a constant-density writer of magnetic storage media implements a method that accepts write data from a host. The constant-density writer determines respective bit periods for ones of multiple concentric tracks of a disk of magnetic storage media. Each bit period is associated with a particular concentric track. The respective bit periods vary based on respective radiuses of the multiple concentric tracks and are configured to maintain a particular bit density across the multiple concentric tracks. The constant-density writer selects, for the write data, a concentric track from among the multiple concentric tracks. The constant-density writer delays, based on the bit period associated with the concentric track, transitions between bits of the write data to generate phase-delayed write data. In this way, the bits of the phase-delayed write data have a bit period that is associated with the concentric track. The bits of the phase-delayed write data are written along the concentric track such that the concentric track has the particular bit density.

In other aspects, an apparatus comprises an interface to receive write data from a host, a disk of magnetic storage media to store the write data, a magnetic media writer configured to write the write data to the magnetic storage media as data bits, and a constant-density writer. The constant-density writer is configured to determine respective bit periods for ones of the multiple concentric tracks. Each bit period is associated with a particular concentric track. The respective bit periods vary based on respective radiuses of the multiple concentric tracks and are configured to maintain a particular bit density across the multiple concentric tracks. The constant-density writer is also configured to select, for the write data, a concentric track from among the multiple concentric tracks. The concentric track is associated with a bit period of the respective bit periods. To generate phase-delayed write data, the constant-density writer delays, based on the bit period of the concentric track, transitions between bits of the write data effective to cause bits of the phase-delayed write data to have the bit period associated with the concentric track. The constant-density writer is further configured to transmit, to the magnetic media writer, the phase-delayed write data to enable the concentric track to have the particular bit density.

In yet other aspects, a System-on-Chip (SoC) is described that includes an interface to a host from which write data is received, an interface to a magnetic media writer of the magnetic storage media, and a constant-density writer that is implemented at least partially in hardware. The constant-density writer is configured to determine respective bit periods for ones of the multiple concentric tracks. Each bit period is associated with a particular concentric track. The respective bit periods vary based on respective radiuses of the multiple concentric tracks and are configured to maintain a particular bit density across the multiple concentric tracks. The constant-density writer is also configured to select, for the write data, a concentric track from among the multiple concentric tracks. The concentric track is associated with a bit period of the respective bit periods. To generate phase-delayed write data, the constant-density writer delays, based on the bit period of the concentric track transitions between bits of the write data effective to cause bits of the phase-delayed write data to have the bit period associated with the concentric track. The constant-density writer is further configured to transmit, to the magnetic media writer, the phase-delayed write data to enable the concentric track to have the particular bit density.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of constant-density writing for magnetic storage media are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

To accommodate greater amounts of user data, it is beneficial to efficiently utilize an area of a media disk. Constant-density writing, for instance, as described in the present disclosure, enables a media disk to have a similar bit density across different concentric tracks with different radiuses. Instead of writing data using a single frequency, data can be written at higher frequencies along concentric tracks that are positioned towards an outside of the media disk relative to data written along other concentric tracks that are positioned towards a center of the media disk. In this way, constant-density writing efficiently utilizes the area of the media disk and enables additional data to be written to the media disk.

Some conventional media drives, however, generate a write pattern based on a fixed clock frequency, which is determined based on the media disk's rotation. In some media drives, the clock frequency can be adjusted relative to the media disk's rotation. These adjustments, however, may be relatively large and not sufficiently small enough to realize constant-density writing. Consequently, the media drive generates multiple regions across the media disk that have different bit densities, which is less efficient than constant-density writing.

This disclosure describes apparatuses and techniques of constant-density writing for magnetic storage media. Instead of adjusting a clock frequency relative to a media disk's rotation, the described apparatuses and techniques implement constant-density writing that delay transitions between bits within a data stream. In particular, a constant-density writer accepts write data having an initial bit period based on a fixed clock signal. The clock signal is generated based on the rotation of a media disk. The constant-density writer modifies the write data to generate phase-delayed write data, which has a bit period that is greater than or equal to the initial bit period. To realize the bit period, the constant-density writer changes write phases of bit transitions within the write data. The constant-density writer can also insert stretch bits, filter single-bit transitions, and mitigate glitches within the phase-delayed write data.

The following discussion describes an operating environment, techniques that are employed in the operating environment, and a System-on-Chip (SoC) in which components of the operating environment are embodied. In the context of the present disclosure, reference is made to the operating environment by way of example only.

Operating Environment

Figure 1:
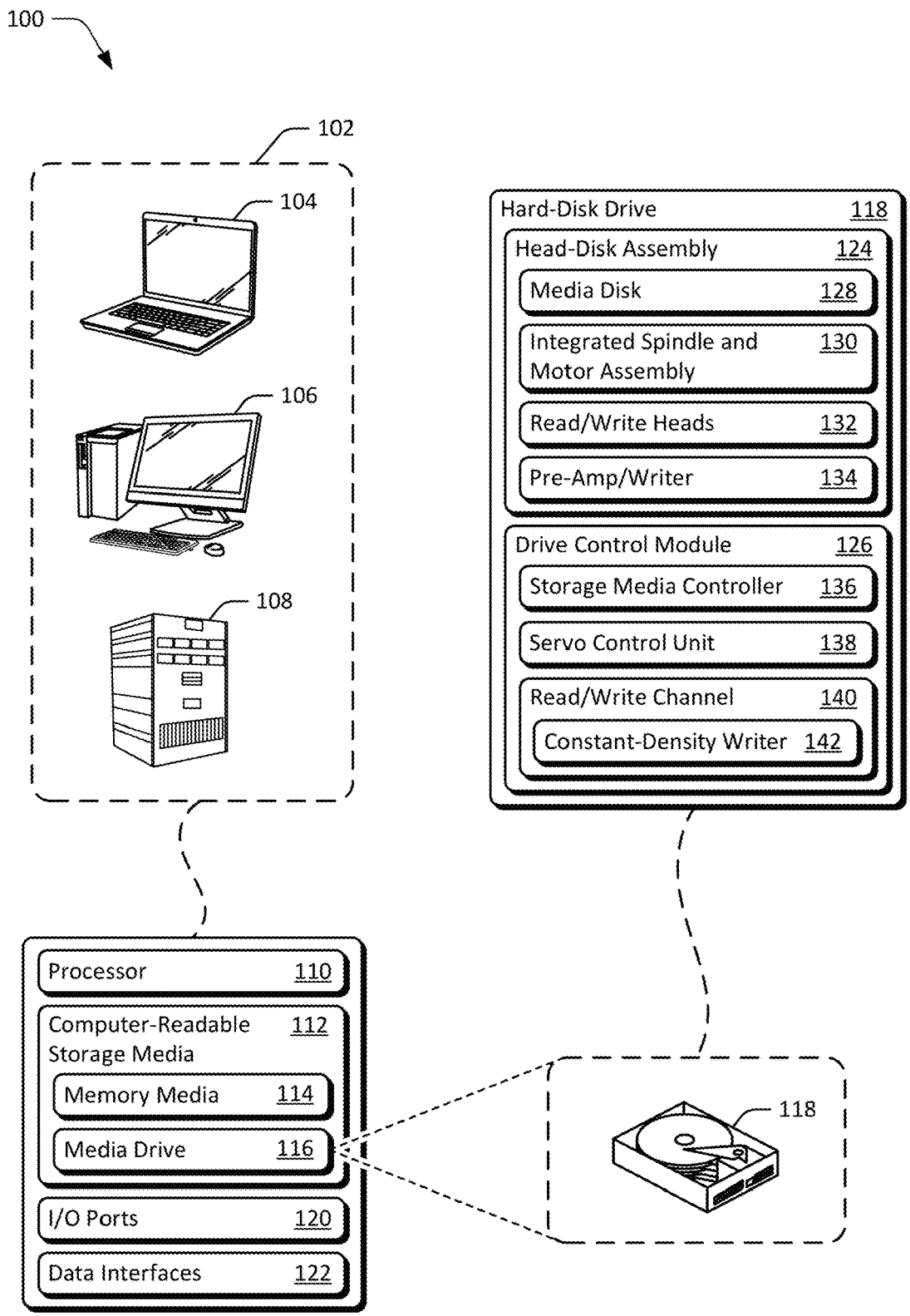
FIG. 1 illustrates an example operating environment having devices in which magnetic storage media is implemented in accordance with one or more implementations.

FIG. 1 illustrates an example operating environment 100 having a computing device 102, capable of storing or accessing various forms of data or information. Examples of a computing device 102 include a laptop computer 104, desktop computer 106, and server 108, any of which may be configured as part of a storage network or cloud storage. Further examples of a computing device 102 (not shown) include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on.

Generally, the computing device 102 provides, communicates, or stores data for any suitable purpose, such as to enable functionalities of a particular type of device, provide a user interface, enable network access, implement gaming applications, playback media, provide navigation, edit content, provide data storage, or the like. Alternatively or additionally, the computing device 102 is capable of storing various data, such as databases, user data, multimedia, applications, operating systems, and the like. One or more computing devices 102 may be configured to provide remote data storage or services, such as cloud storage, archiving, backup, client services, records retention, and so on.

The computing device 102 includes a processor 110 and computer-readable storage media 112. The processor 110 is implemented as any suitable type or number of processors, either single-core or multi-core (e.g., ARM or x86 processor cores), for executing instructions or commands of an operating system or other programs of the computing device 102. The computer-readable storage media 112 (CRM 112) includes memory media 114 and a media drive 116. The memory media or system memory of the computing device 102 includes any suitable type or combination of volatile memory or nonvolatile memory. For example, volatile memory of the computing device 102 includes various types of random-access memory (RAM), dynamic RAM (DRAM), static RAM (SRAM), or the like. The non-volatile memory may include read-only memory (ROM), electronically erasable programmable ROM (EEPROM) or Flash memory (e.g., NOR Flash or NAND Flash). These memories, individually or in combination, store data associated with applications and/or an operating system of computing device 102.

The media drive 116 of the computing device 102 includes one or more media drives or be implemented as part of a data storage system with which the computing device 102 is associated. In this example, the media drive 116 includes a hard-disk drive 118 (HDD 118), which is capable of storing data and is described with reference to various aspects of constant-density writing. Alternatively or additionally, the media drive 116 may be configured as any suitable type of data storage drive or system, such as a storage device, storage drive, storage array, storage volume, or the like. Although described with reference to the computing device 102, the media drive 116 may also be implemented separately as a standalone device or as part of a larger storage collective, such as a data center, server farm, or virtualized storage system (e.g., for cloud-based storage or services) in which aspects of constant-density writing are implemented.

In the depicted configuration, the computing device 102 also includes I/O ports 120, a graphics processing unit (GPU, not shown), and data interfaces 122. Generally, the I/O ports 120 allow a computing device 102 to interact with other devices, peripherals, or users. For example, the I/O ports 120 may include or be coupled with a universal serial bus, human interface devices, audio inputs, audio outputs, or the like. The GPU processes and renders graphics-related data for computing device 102, such as user interface elements of an operating system, applications, or the like. In some cases, the GPU accesses a portion of local memory to render graphics or includes dedicated memory for rendering graphics (e.g., video RAM) of the computing device 102.

The data interfaces 122 of the computing device 102 provide connectivity to one or more networks and other devices connected to those networks. The data interfaces 122 may include wired interfaces, such as Ethernet or fiber-optic interfaces for data communicated over a local network, intranet, or the Internet. Alternatively or additionally, the data interfaces 122 may include wireless interfaces that facilitate communication over wireless networks, such as wireless LANs, wide-area wireless networks (e.g., cellular networks), and/or wireless personal-area-networks (WPANs). Any of the data communicated through the I/O ports 120 or the data interfaces 122 may be written to or read from the storage system of the computing device 102 in accordance with one or more aspects of constant-density writing for magnetic storage media.

Returning to the media drive 116, the computing device 102 includes the hard-disk drive 118 as shown and/or other types of storage media on which constant-density writing is implemented. Although not shown, other configurations of the media drive 116 are also contemplated, such as a magnetic tape drive, optical media drives, HDD/SSD hybrid drives, and other storage systems that write data to storage media (e.g., magnetic or optical storage media). Alternatively or additionally, the computing device 102 may include an array of media drives or serve as a media drive aggregation device or host for multiple media drives in which aspects of constant-density writing are implemented.

In this example, the disk drive 118 includes a head-disk assembly 124 (HDA 124) and drive control module 126 to implement or enable functionalities of the hard-disk drive 118, which can include self-servo writing. In some cases, the drive control module 126 is implemented as a printed circuit board assembly (PCBA) with semiconductor devices, logic, or other circuitry. The HDA 124 includes one or more media disks 128 mounted on an integrated spindle and motor assembly 130. The spindle and motor assembly 130 rotates the media disk 128 under (or over) read/write heads 132 coupled with a head assembly (not shown) of the HDA 124. The media disks 128 may be coated with a magnetically hard material (e.g., a particulate surface or a thin-film surface) and may be written to, or read from, a single side or both sides.

The read/write heads 132 are operably coupled with a pre-amplifier/writer module 134 (pre-amp/writer 134) of the HDA 124 that includes pre-amplifier circuitry. The pre-amp/writer 134 receives or stores head selection, amplification, or sense current values useful for writing data to, or reading data from, the magnetic media 202.

As shown in FIG. 1, the example drive control module 126 of the hard-disk drive 118 includes a storage media controller 136, a servo control unit 138, and a read/write channel 140 (R/W channel 140). In some aspects, the read/write channel 140 includes a constant-density writer 142 to generate, manage, or alter various signals or data to implement features of constant-density writing for magnetic storage media. The constant-density writer 142 is further described with respect to FIGS. 3-6. Generally, the drive control module 126 directs or uses the servo control unit 138 to control mechanical operations, such as read/write head 132 positioning through the HDA 124 and rotational speed control through the spindle and motor assembly 130. The drive control module 126 or components thereof may be implemented as one or more IC chips, a System-on-Chip, a System-in-Package, or a microprocessor provided with or implementing a hard-disk-drive controller. The drive control module 126 may also include drive electronics (not shown) and/or include various interfaces, such as a host-bus interface, storage media interface, spindle interface, or a pre-amp/writer interface.

Figure 2:
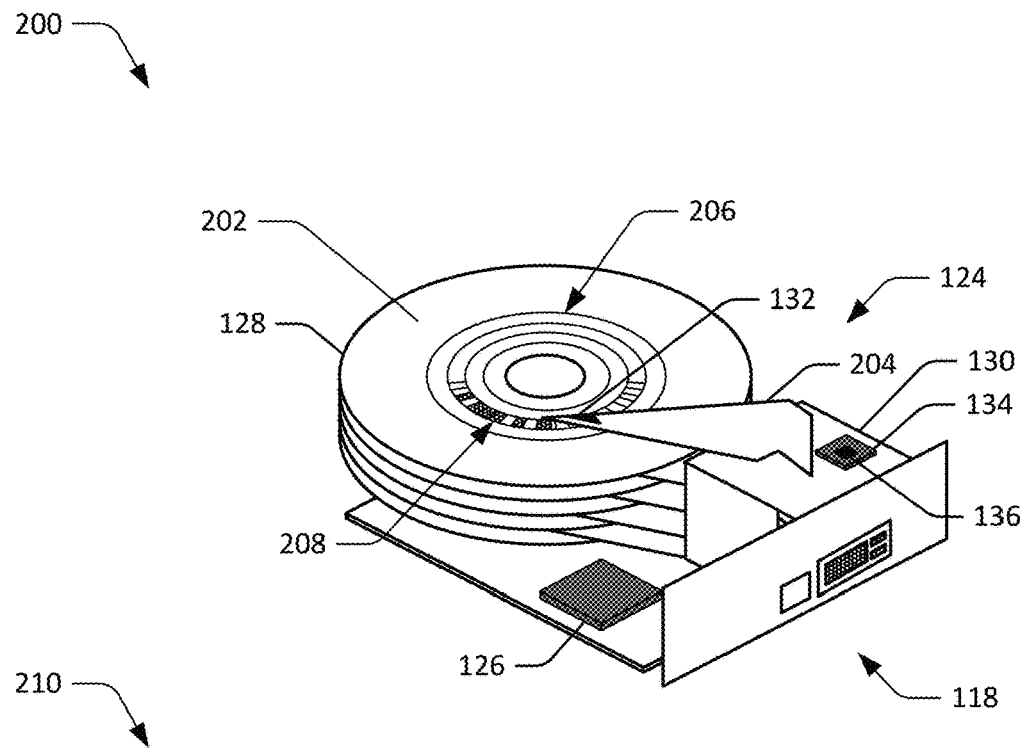
FIG. 2 illustrates an example configuration of the hard-disk drive shown in FIG. 1.
Figure 2:
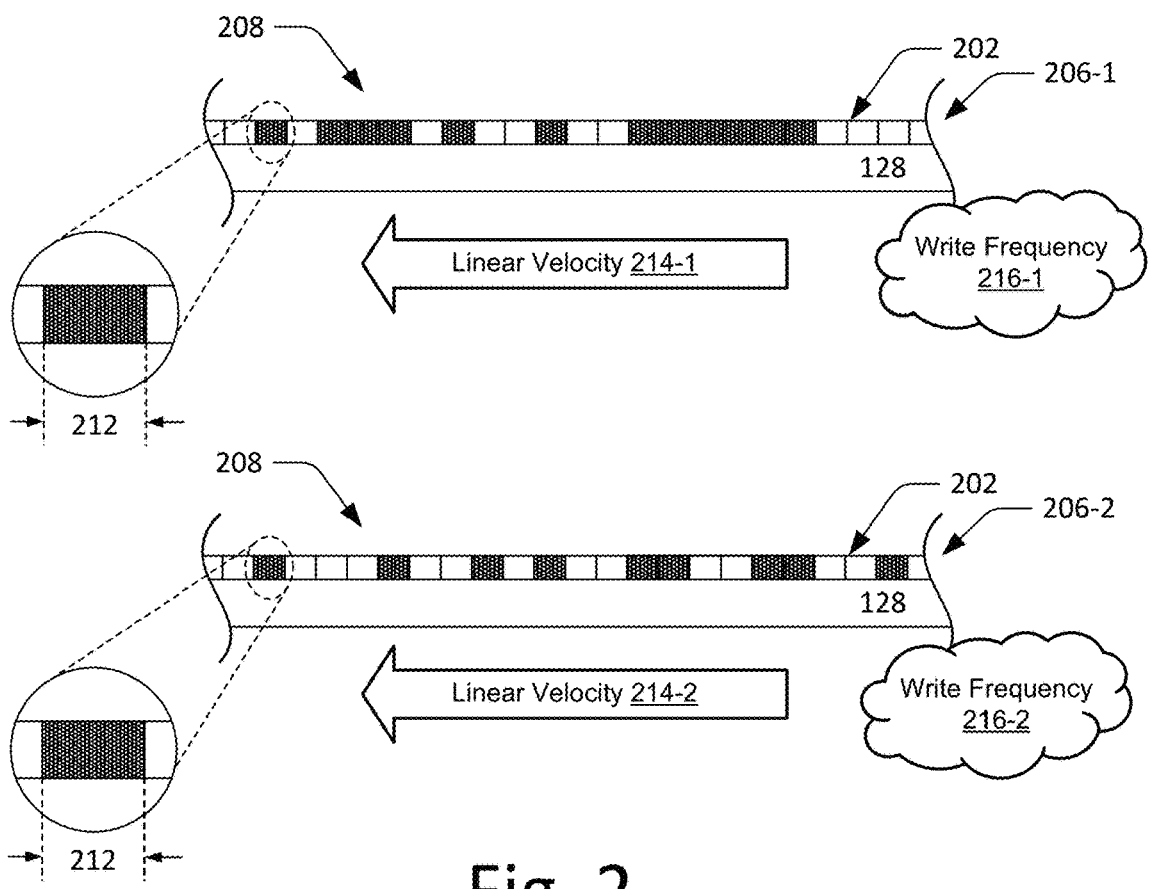

By way of example, consider FIG. 2 which provides an example configuration of the hard-disk drive 118, illustrated generally at 200. As shown in FIG. 2, the HDA 124 of the hard-disk drive 118 includes an integrated spindle and motor assembly 130 by which media disks 128 of magnetic media 202 are supported and/or operated. An arm 204 may maneuver, and thus position a read/write head 132 (or multiple read/write heads 132) over a desired track 206 of the magnetic media 202 on the media disk 128. In various aspects, the read/write head 132 includes various numbers of head elements with combined or separate functions (e.g., dedicated R/W functions). For example, the read/write head 132 includes one or more readers (read heads/elements) and one writer (write head/element). In other cases, the read/write head 132 includes a dedicated write head (element) and one or more separate, additional dedicated read heads (elements). Alternatively or additionally, although multiple arms 204 are shown in FIG. 2, the HDA 124 or spindle and motor assembly 130 may be implemented with a single arm 204 or other suitable structures for positing the read/write head 132. The HDA 124 and the drive control module 126 may be implemented separately, on separate substrates, and/or as separate PCBAs of a media drive. Signals or data communicated between the HDA 124 and the drive control module 126 may be carried through a flexible printed cable or other suitable connective structures, such as traces, connectors, bond wires, solder balls, or the like.

FIG. 2 also includes an illustration of example magnets 208 written to the magnetic media 202 of a media disk 128. One or more of the read/write heads 132 write magnets 208 to respective ones of the tracks 206 of a media disk 128, where sectors are provided for each of the tracks (e.g., a sector of tracks 206). For illustrative purposes, a top media disk 128 is shown to include tracks 206, for example, after being written with magnets 208 by a read/write head 132. Generally, during write operations, the read/write head 132 is driven by a write current provided by the pre-amp/writer 134, whereby an electrical signal is used to generate and/or transfer magnetic fields having associated polarities to the media disk 128. In response to application of the magnetic fields or write fields, the read/write head 132 forms a plurality of magnets 208 in magnetic grains of the tracks 206 of the media disk 128. The HDA 124 of the hard-disk drive 118 is configured to perform write operations in accordance with any suitable recording technology, such as perpendicular magnetic recording (PMR), shingled magnetic recording (SMR), heat-assisted magnetic recording (HAMR), microwave-assisted magnetic recording (MAMR), or the like.

As shown at 210, the magnetic media 202 includes a first concentric track 206-1 and a second concentric track 206-2. The first concentric track 206-1 is positioned near an inside of the magnetic media 202 while the second concentric track 206-2 is positioned near an outside of the magnetic media 202. Consequently, the first concentric track 206-1 has a smaller radius and circumference relative to the second concentric track 206-2. While the magnetic media 202 is spinning, the first concentric track 206-1 has a linear velocity 214-1, which is slower than a linear velocity 214-2 of the second concentric track 206-2 due to the differences in radiuses. In order to realize a constant-density across the magnetic media 202, the constant-density writer 142 generates phase-delayed write data having different bit periods (e.g., different magnet periods or different magnetic write periods) for different concentric tracks 206. The differences in the bit periods cause the pre-amp/writer 134 to write with a first write frequency 216-1 across the first concentric track 206-1 and write with a second write frequency 216-2 across the second concentric track 206-2. The second write frequency 216-2 is higher than the first write frequency 216-1 in order to compensate for the differences in the linear velocities 214-1 and 214-2. By using the appropriate write frequency 216, the pre-amp/writer 134 writes magnets having approximately the same effective bit period 212 along the first concentric track 206-1 and the second concentric track 206-2. In this manner, the constant-density writer 142 enables the data bits to have a constant density across the media disk 128 in order to efficiently utilize the area of the media disk 128.

Figure 3:
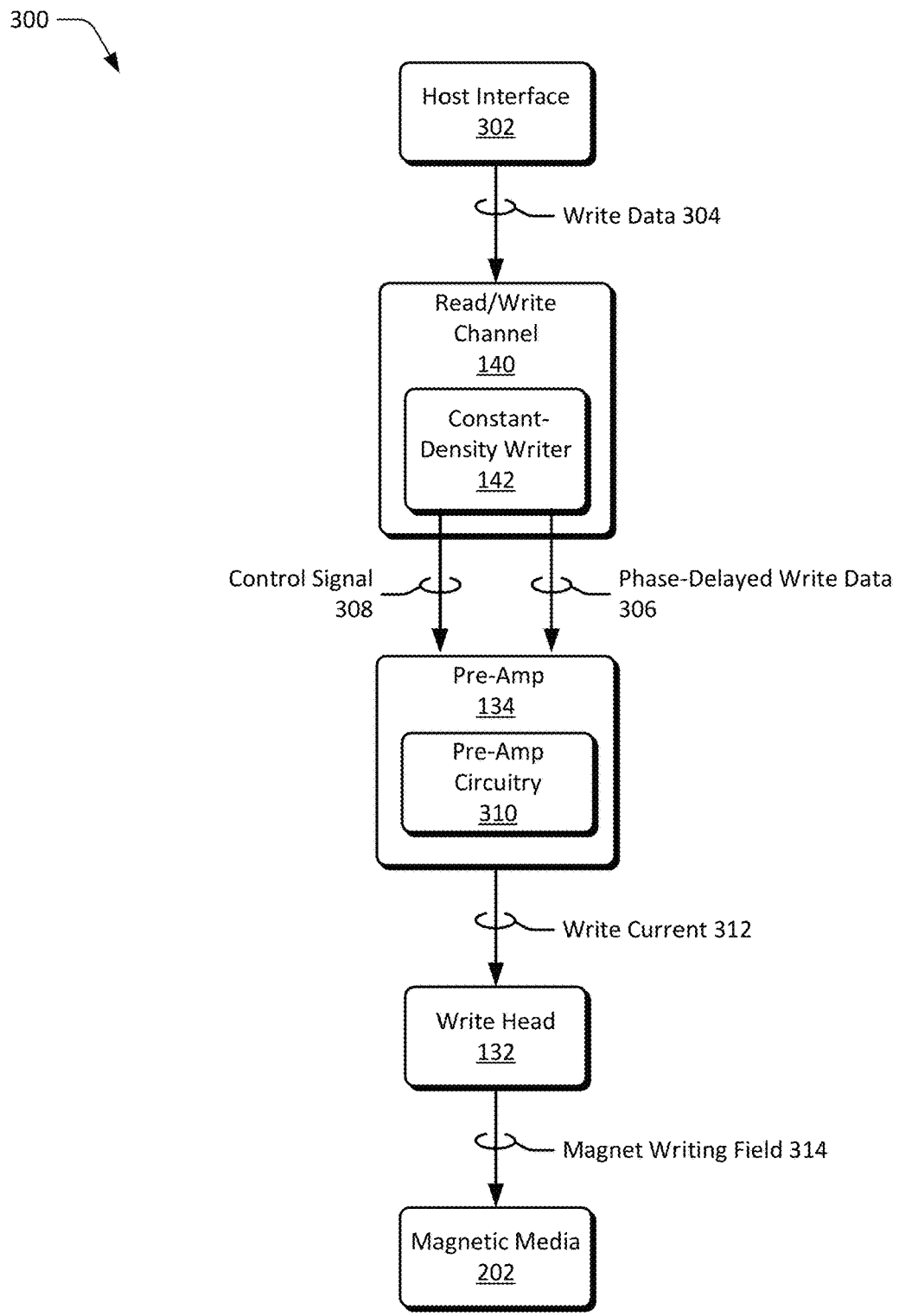
FIG. 3 illustrates an example configuration of the read/write channel of FIG. 1.

FIG. 3 illustrates example configurations of a read/write channel 140, which is implemented in accordance with one or more aspects of constant-density writing for magnetic storage media. In this example, the constant-density writer 142 is operably coupled with the read/write channel 140.

In this example, a host interface 302 provides write data 304 or other information to the read/write channel 140 or a storage media controller on which the read/write channel 140 is embodied. Generally, the read/write channel 140 provides, to the pre-amp 134 of a media drive, phase-delayed write data 306, which may include a signal corresponding to a data pattern intended for writing on the media. In aspects of constant-density writing, the constant-density writer 142 alters the phase-delayed write data 306 sent to the pre-amp 134, such as by adjusting the bit period based on a selected concentric track 206, inserting stretch bits, filtering single-bit transitions, or any combination of the like. The constant-density writer 142 may also generate or cause the read/write channel 140 to generate a control signal 308 for the pre-amp 134 to enable or disable operation of the pre-amp 134.

Generally, the pre-amp 134 or pre-amp circuitry 310 generates or provides a write current to the write head 132 of the media drive 116 with the pattern of polarity or transitions corresponding to the phase-delayed write data 306 (modified or not) and/or control signal 308 for constant-density writing. Based on the data and/or control signal pattern provided by the read/write channel 140 and constant-density writer 142, the pre-amp 134 generates pulses, or changes polarity of, the write current that is sent to the write head 132.

The write current 312 generated by the pre-amp 134 is provided to a corresponding write head 132 for the magnetic media 202. Based on the write current 312, the write head 132 generates a magnet writing field 314 to form magnets that correspond to the phase-delayed write data 306 or any suitable form of signaling or encoding for data received from the host interface 302. For example, the magnet writing field 314 pulses on transitions of phase-delayed write data 306 to write or form respective magnets of corresponding polarity in the magnetic media 202.

Figure 4:
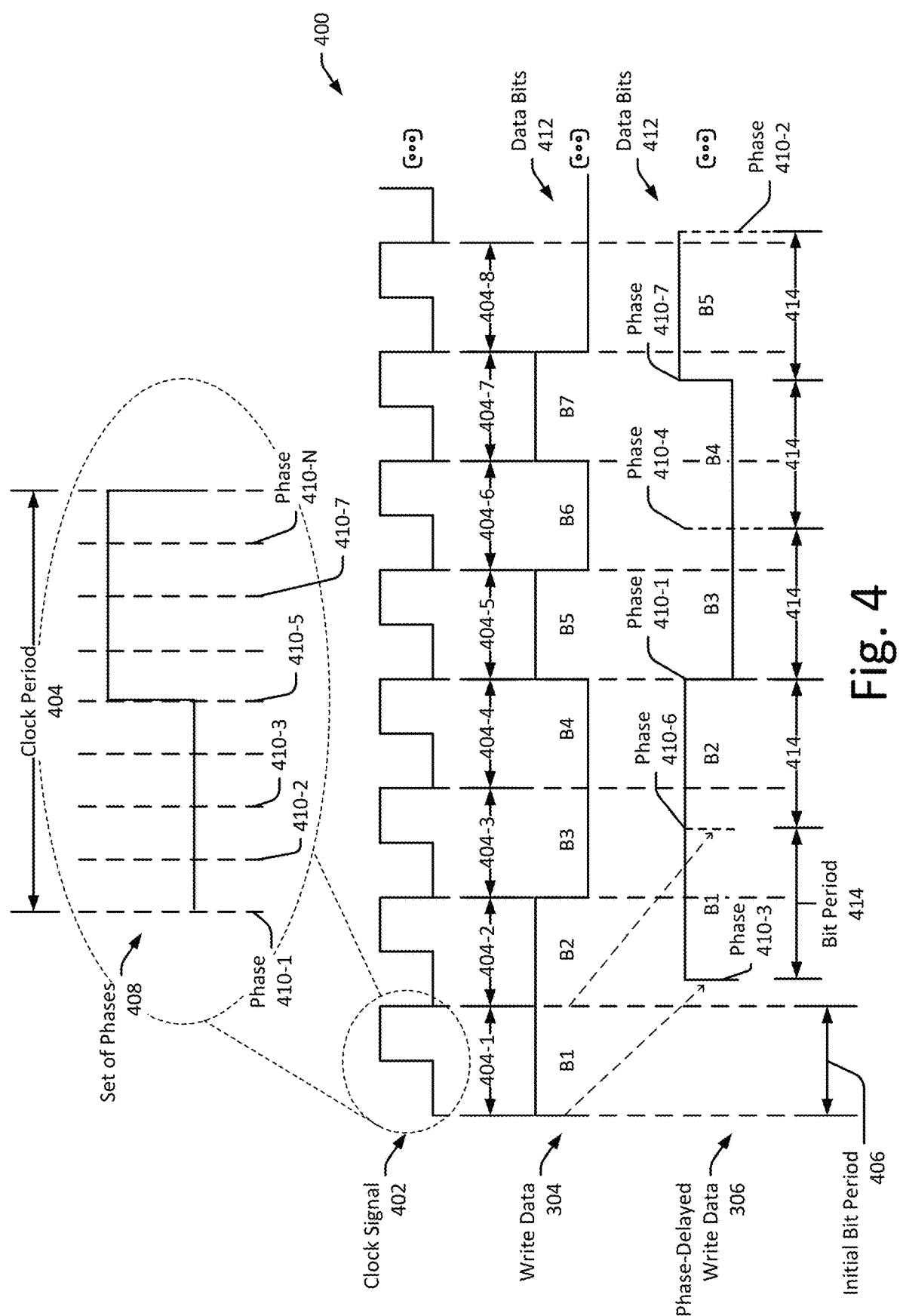
FIG. 4 illustrates an example graph of the write data and the phase-delayed write data of FIG. 3.

By way of example, consider FIG. 4 which illustrates at 400 an example time graph of write data 304 and phase-delayed write data 306 in accordance with various aspects of constant-density writing. The graphs or waveforms of FIG. 4 also include a clock signal 402, which can be generated by or derived from a phase-locked loop (PLL) of the read/write channel 140 or another suitable oscillator. Generally, a clock period 404 (or frequency) of the clock signal 402 is determined and held constant based on the media disk's 128 rotation. The clock period 404 forms a time base, which sets an initial bit period 406 of the write data 304. In other words, the initial bit period 406 is equal to the clock period 404.

In order to perform constant-density writing, the constant-density writer 142 (of FIG. 3) identifies a set of phases 408, which divides the clock period 404. In FIG. 4, the set of phases 408 includes phases 410-1 to 410-N, where N represents a positive integer. As an example, the quantity of phases 410 (e.g., N) can be on the order of tens, hundreds, or thousands, and is chosen to enable the constant-density writer 142 to shift the phases of data bits 412 within the write data 304 by sufficiently small increments to realize a particular bit period for constant-density writing. Generally, the clock period 404 can be an integer quantity of time units while the interval between phases 410 can include any fraction of time unit 404. A least significant bit of the phases 410 can be a tenth of a nanosecond, a hundredth of a nanosecond, or a picosecond, for instance.

The data bits 412 of the write data 304 are represented as B1 to B7 in FIG. 4. The write data 304 has the initial bit period 406 such that each data bit 412 occurs during a particular clock period 404 (e.g., clock periods 404-1 to 404-7) of the clock signal 402.

To realize constant-density writing, the constant-density writer 142 modifies the initial bit period 406 associated with the data bits 412 to generate the phase-delayed write data 306. The phase-delayed write data 306 includes the data bits 412 associated with the write data 304 and has a concentric-track-based bit period 414 that is greater than or equal to the initial bit period 406. The constant-density writer 142 sets the bit period 414 based on a selected concentric track 206 for writing the write data 304 in order to compensate for the linear velocity associated with the selected concentric track 206.

To realize the bit period 414, the constant-density writer 142 adjusts phases of the data bits 412 by various amounts. Consider a simplified example in which the clock period 404 is 10 nanoseconds (ns), the quantity of phases is equal to 8 (e.g., N equals 8), and the bit period 414 is 13.75 ns. The phases 410 are in increments of the clock period 404 divided by the quantity of phases, which is 1.25 ns in this example. In other words, the first phase 410-1 occurs at a beginning of the clock period 404, the second phase 410-2 is 1.25 ns from the beginning of the clock period 404, the third phase 410-2 occurs is 2.5 ns from the beginning of the clock period 404 (e.g., 1.25 ns from the second phase 410-2), and so forth. In this case, the bit period 414 is equal to a summation of the clock period 404 and the third phase 410-3. In general, the bit period 414 can be equal to a summation of any multiple of the clock period 404 with any phase 410.

To generate the phase-delayed write data 306, the constant-density writer 142 delays the start of data bit B1 from the phase 410-1 of the clock period 404-1 to the phase 410-2 of the clock period 404-2. This delay can be based on a previous data bit, which is not shown. Additionally, the constant-density writer 142 delays the start of data bit B2 from the phase 410-1 of the second clock period 404-2 to the phase 410-5 of the clock period 404-3. In this way, the data bits B1 and B2 have the same concentric-track-based bit period 414. This delay process continues for the other data bits 412 such that the data bit B3 starts at phase 410-1 of the clock period 404-5, the data bit B4 starts at phase 410-4 of the clock period 404-6, and the data bit B5 starts at phase 410-7 of the clock period 404-7. By delaying the start of the data bits 412 within the write data 304, the constant-density writer 142 can adjust bit periods of different concentric tracks 206 by sufficiently small increments to efficiently utilize the area of the media disk 128. The constant-density writer 142 is further described with respect to FIG. 5.

Figure 5:
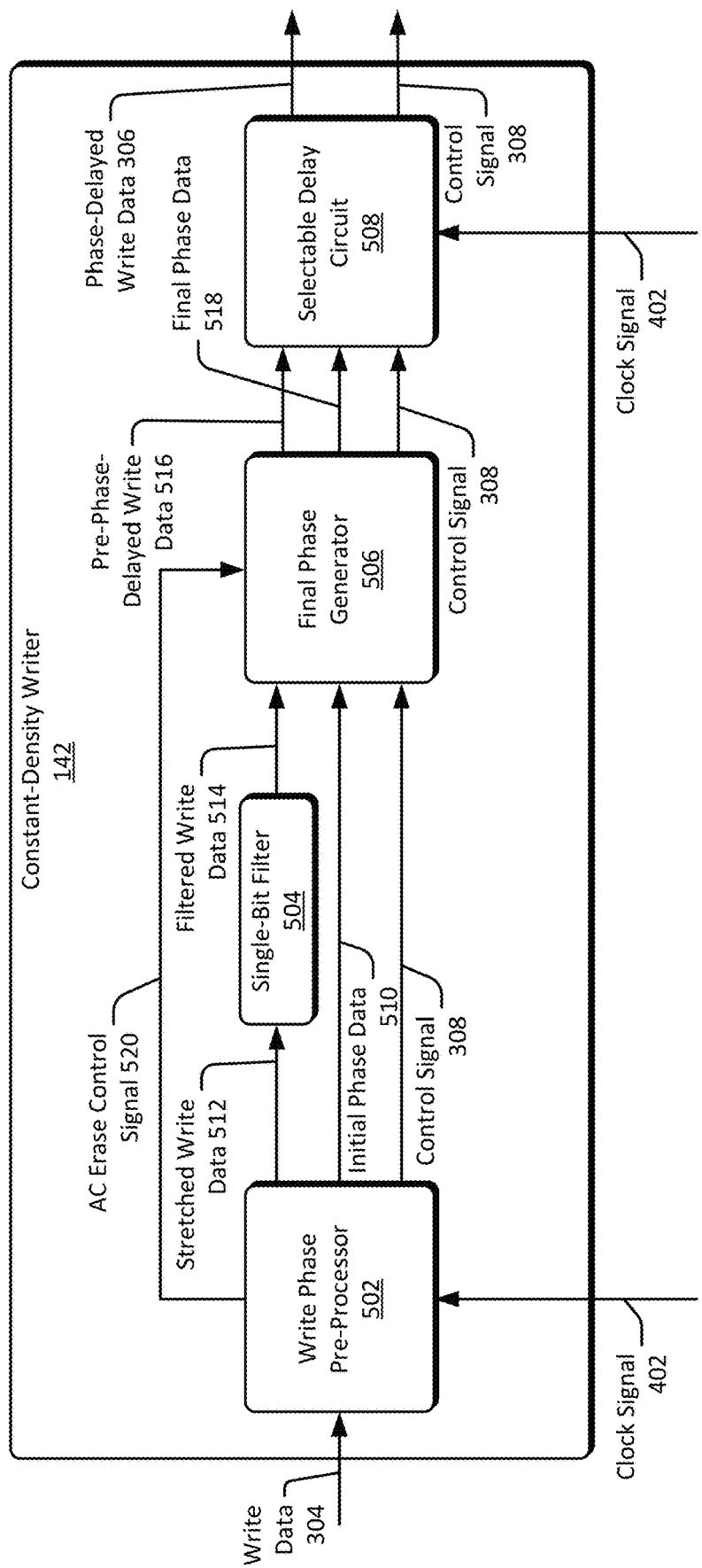
FIG. 5 illustrates an example implementation of the constant-density writer of FIG. 1.

FIG. 5 illustrates an example implementation of a constant-density writer 142. In the depicted configuration, the constant-density writer 142 includes a write phase pre-processor 502, a single-bit filter 504, a final phase generator 506, and a selectable delay circuit 508. The write phase pre-processor 502 is coupled to an input of the constant-density writer 142, the single-bit filter 504, and the final phase generator 506. The input of the constant-density writer 142 can be coupled to other modules within the read/write channel 140 of FIG. 3, such as a write-pattern generator (not shown). The selectable delay circuit 508 is coupled between the final phase generator 506 and an output of the constant-density writer 142. The output of the constant-density writer 142 is coupled to an input to the pre-amp 134 (of FIG. 3).

The write phase pre-processor 502 determines bit periods 414 associated with different concentric tracks 206 of the media disk 128. The bit periods 414 vary based on the radiuses of the concentric tracks 206 to maintain a particular bit density across the concentric tracks 206. The bit periods 414 of consecutive concentric tracks 206 can differ by fractions of a nanosecond. The write phase pre-processor 502 also selects a concentric track 206 for writing data to or receives a selection from another component of the drive control module 126, such as the read/write channel 140. The write phase pre-processor 502 can be implemented as a half-rate clock, a quarter-rate clock, or any symbol-rate clock. The write phase pre-processor 502 generates initial phase data 510, stretched write data 512, and the control signal 308 based on the write data 304, the bit period 414, and the clock signal 402, as further described below with respect to FIG. 6.

The single-bit filter 504 is an optional component, which can be used to mitigate glitches in the phase-delayed write data 306. The single-bit filter 504 removes single-bit transitions within the write data 304. For example, the single-bit filter 504 searches for a bit pattern of 010 within the write data 304 and replaces it with another bit pattern 000. As another example, the single-bit filter 504 searches for a bit pattern of 101 within the write data 304 and replaces it with another bit pattern 111. In some cases, a modulation or encoding scheme implemented by the read/write channel 140 reduces the likelihood of single-bit transitions occurring within the write data 304. Sometimes, however, this pattern occurs at a boundary of a position-error signal (PES) or responsive to a high-speed alternating-current (AC) erase. The single-bit transition at the boundary of PES field can be removed and this pattern in a high-speed AC erase can be permitted without affecting a performance of the media disk 128. The single-bit filter 504 generates filtered write data 514 based on the stretched write data 512.

The final phase generator 506 adjusts a timing of the initial phase data 510 relative to the filtered write data 516 in order to provide sufficient time for the selectable delay circuit 508 to apply the appropriate phase delay for each data bit 412 and to avoid introducing glitches. The final phase generator 506 generates pre-phase-delayed write data 516 and final phase data 518. The final phase generator 506 can also pass the control signal 308 from the write phase pre-processor 502 to the selectable delay circuit 508.

In some cases, the pre-phase-delayed write data 516 is based on the filtered write data 514 in order to write the write data 304 to the media disk 128. For erasing previously-written data, however, the pre-phase-delayed write data 516 can be derived from an erase pattern. The write phase pre-processor 502 can control whether the final phase generator 506 generates the pre-phase-delayed write data 516 based on the filtered write data 514 or the erase pattern using an alternating-current (AC) erase control signal 520.

For writing the data bits 412, the final phase data 518 is generated based on the initial phase data 510, as further described below. For erasing previously-written data, the final phase data 518 can be generated such that the final phase data 518 specifies a constant phase (or a constant delay) of the data bits associated with the erase pattern.

In some aspects, the selectable delay circuit 508 applies phase delays identified within the final phase data 518 to the data bits 412 within the pre-phase-delayed write data 516 to generate the phase-delayed write data 306. The selectable delay circuit 508 provides the phase-delayed write data 306 and the control signal 308 to the pre-amp 134 of FIG. 3. An operation of the constant-density writer 142 is further described with respect to FIG. 6.

Figure 6:
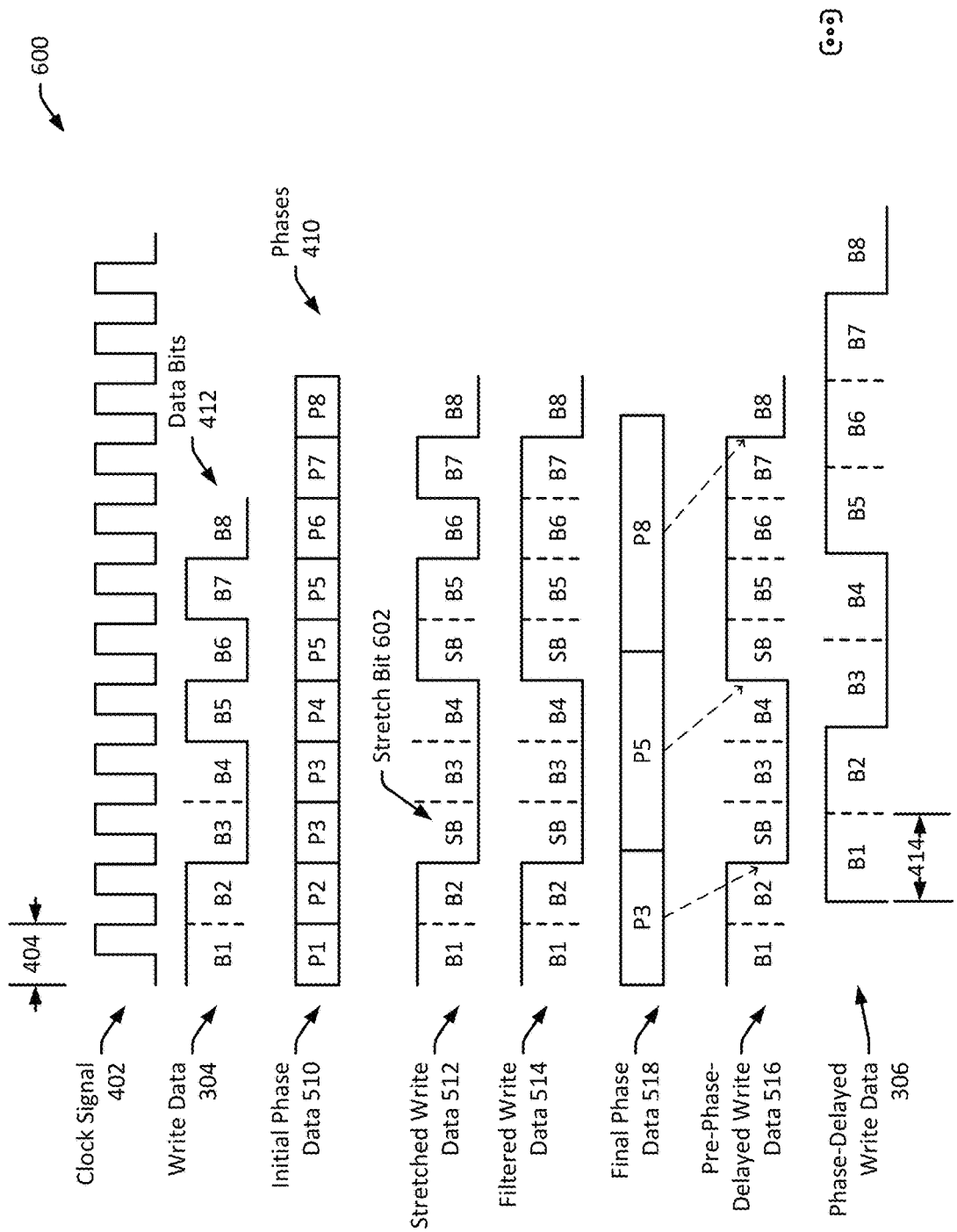
FIG. 6 illustrates an example graph of data generated by the constant-density writer of FIG. 5.

By way of example, consider FIG. 6 which illustrates at 600 an example time graph of data in accordance with various aspects of constant-density writing. The graphs or waveforms of FIG. 6 include the clock signal 402 and the write data 304 (of FIG. 4). Additionally, the graphs or waveforms include the initial phase data 510, the stretched write data 512, the filtered write data 514, the final phase data 518, and the pre-phase-delayed write data 516, which can be generated by the constant-density writer 142 of FIG. 5.

During operation, the write phase pre-processor 502 accepts the write data 304 from the host interface 302 (of FIG. 3) or the read/write channel 140. In some cases, the read/write channel 140 modulates or encodes the write data 304 prior to providing the write data to the write phase pre-processor 502. Generally, the write data 304 includes the data bits 412 associated with the initial bit period 406, as shown in FIG. 4. The initial bit period 406 is determined based on the clock period 404 of the clock signal 402 that is generated based on the media disk's 128 rotation.

The write phase pre-processor 502 generates the initial phase data 510 based on the clock signal 402 and the bit period 414 for a selected concentric track 206. The initial phase data 510 includes starting phases 410 associated with respective data bits 412 of the write data 304. The starting phases 410 are represented as P1 to P8, which are respectively associated with bits B1 to B8.

The write phase pre-processor 502 also generates the stretched write data 512 based on the write data 304. The stretched write data 512 is similar to the write data 304, except for the addition of stretch bits 602, which are respected as SB in FIG. 6. The stretch bits 602 are added in cases in which the initial phase data 510 causes the start of a data bit 412 to occur one or more intervals of the clock period 404 later. In some cases, consecutive stretch bits 602 are added to enable the bit transition to occur at a particular time interval with respect to the clock period 404. By including the stretch bits 602, the information associated with the data bit 412 is retained during the delay.

The single-bit filter 504 generates the filtered write data 514 based on the stretched write data 512. In this example, the single-bit filter 504 changes a value of the data bit B6 from zero to one in order to change the 101 pattern across bits B5 to B7 in the stretched write data 512 to a 111 pattern in the filtered write data 514.

The final phase generator 506 generates the pre-phase-delayed write data 516, which is the filtered write data 514. The final phase generator 506 also generates the final phase data 518 based on the initial phase data 510. In particular, the final phase generator 506 removes phases 410 that are not associated with a transition between a 0 and a 1. For example, the final phase data 518 does not include the phase P2 associated with the data bit B2, the phase P4 associated with the data bit B4, or the phases P6 and P7 associated with the data bits B6 and B7, respectively. The final phase generator 506 also advances a timing of the phases 410 such that the phase occurs at least one clock period 404 before the corresponding data bit.

The selectable delay circuit 508 generates the phase-delayed write data 306 based on the pre-phase-delayed write data 516 and the final phase data 518. In particular, the selectable delay circuit 508 delays the transition between the data bits 412 within the pre-phase-delayed write data 516 according to the final phase data 518. Due to this delay, the data bits 412 within the phase-delayed write data 306 have the bit period 414, which is different from the initial bit period 406 (e.g., different than the clock period 404).

The constant-density writer 142 can also determine a starting phase (or starting position) to begin the writing of the phase-delayed write data 306 on the concentric track 206. Each starting phase can be chosen to align the data bits 412 across multiple concentric tracks 206 (e.g., to align the data bits 412 between the concentric track 206 and an adjacent concentric track 206).

Techniques of Constant-Density Writing

The following discussion describes techniques of constant-density writing for magnetic storage media, which may improve writing efficiency. These techniques may be implemented using any of the environments and entities described herein, such as the read/write channel 140 or constant-density writer 142. These techniques include method 700 illustrated in FIG. 7, which is shown as a set of operations performed by one or more entities.

This method is not necessarily limited to the orders of operations shown in the associated figure. Rather, any of the operations may be repeated, skipped, substituted, or re-ordered to implement various aspects described herein. Further, this method may be used in conjunction with one another, in whole or in part, whether performed by the same entity, separate entities, or any combination thereof. For example, aspects of the method described may be combined to implement constant-density writing for magnetic media with a combination of adjusting bit periods, inserting stretch bits, filtering single-bit transitions, and mitigating glitches. In portions of the following discussion, reference will be made to the operating environment 100 of FIG. 1, entities of FIGS. 2, 3, and 5. Such reference is not to be taken as limiting described aspects to the operating environment 100, entities, configurations, or implementations, but rather as illustrative of one of a variety of examples. Alternately or additionally, operations of the methods may also be implemented by or with entities described with reference to the System-on-Chip of FIG. 8 and/or the storage media controller of FIG. 9.

Figure 7:
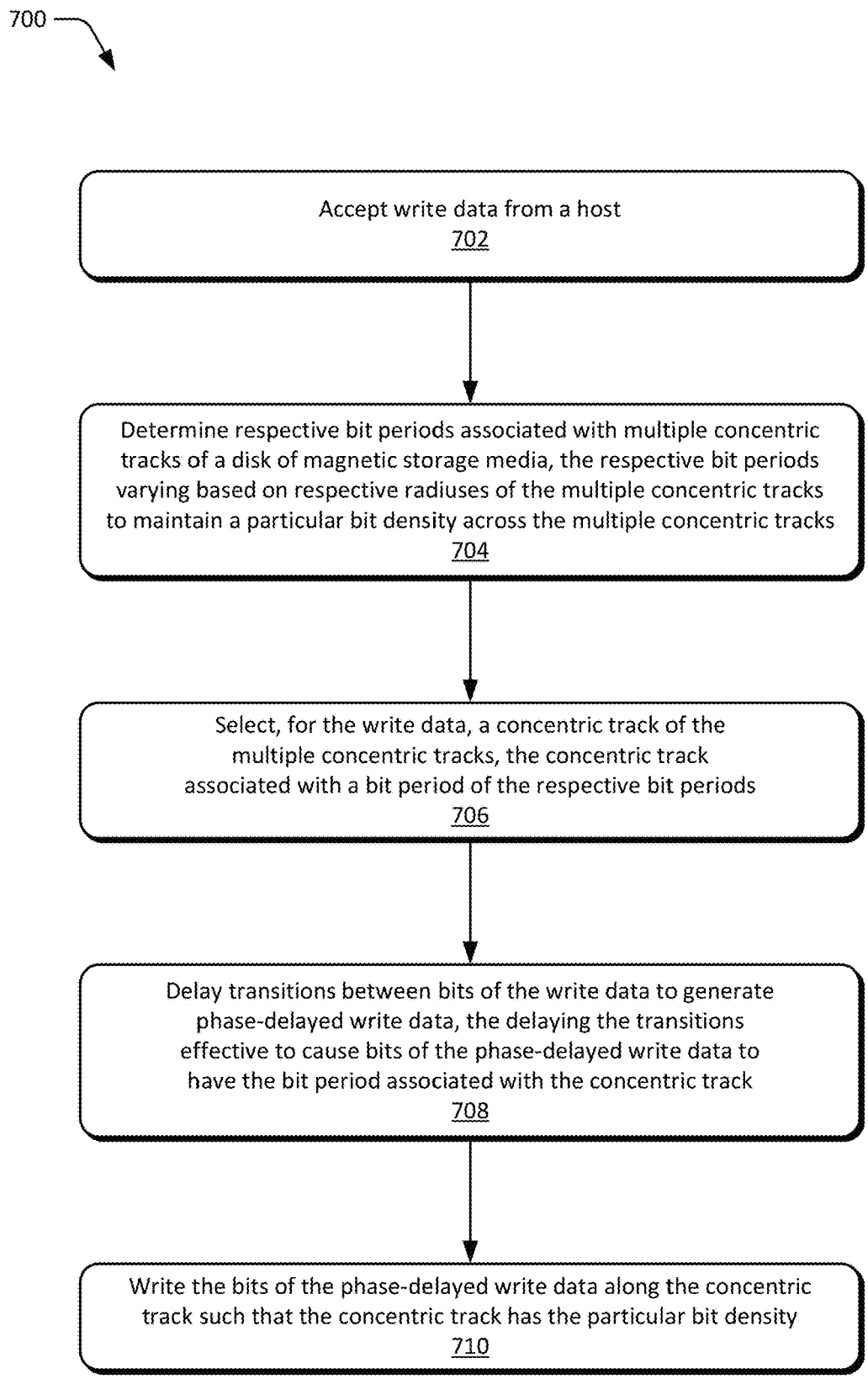
FIG. 7 depicts an example method for implementing constant-density writing for magnetic storage media using the constant-density writer of FIG. 5.

FIG. 7 depicts an example method 700 for implementing constant-density writing of magnetic storage media, including operations performed, at least in part, by the constant-density writer 142.

At 702, write data is accepted from a host. For example, the host interface 302 accepts the write data 304 from a host, as shown in FIG. 3. The read/write channel 140 can modulate and encode the write data 304 prior to providing the write data 304 to the constant-density writer 142.

At 704, respective bit periods associated with multiple concentric tracks of a disk of magnetic storage media are determined. The respective bit periods vary based on respective radiuses of the multiple concentric tracks to maintain a particular bit density across the multiple concentric tracks. For example, the constant-density writer 142 determines respective bit periods 414 associated with multiple concentric tracks of the media disk 128. The respective bit periods 414 vary based on respective radiuses of the multiple concentric tracks 206 to maintain a particular bit density across the multiple concentric tracks. In this way, the respective bit periods 414 can compensate for differences in linear velocities associated with the multiple concentric tracks 206 and enable the data written to the media disk 128 to have a same effective bit period 212, as described above with respect to FIG. 2.

At 706, a concentric track of the multiple concentric tracks is selected for the write data. The concentric track is associated with a bit period of the respective bit periods. For example, the constant-density writer 142 or the read/write channel 140 selects, for the write data 304, the concentric track 206, which is associated with one of the bit periods 414.

At 708, transitions between bits of the write data are delayed based on the bit period associated with the concentric track to generate phase-delayed write data. The delaying of the transitions is effective to cause bits of the phase-delayed write data to have the bit period associated with the concentric track. For example, the constant-density writer 142 delays, based on the bit period 414 associated with the concentric track 206, the transitions between bits of the write data 304 to generate the phase-delayed write data 306. Consequently, the phase-delayed write data has the bit period 414 associated with the concentric track, as shown in FIG. 4.

At 710, the bits of the phase-delayed write data are written along the concentric track such that the concentric track has the particular bit density. For example, the pre-amp 134 and the write head 132 write the phase-delayed write data 306 along the concentric track 206 such that the concentric track 206 has the particular bit density.

System-on-Chip

Figure 8:
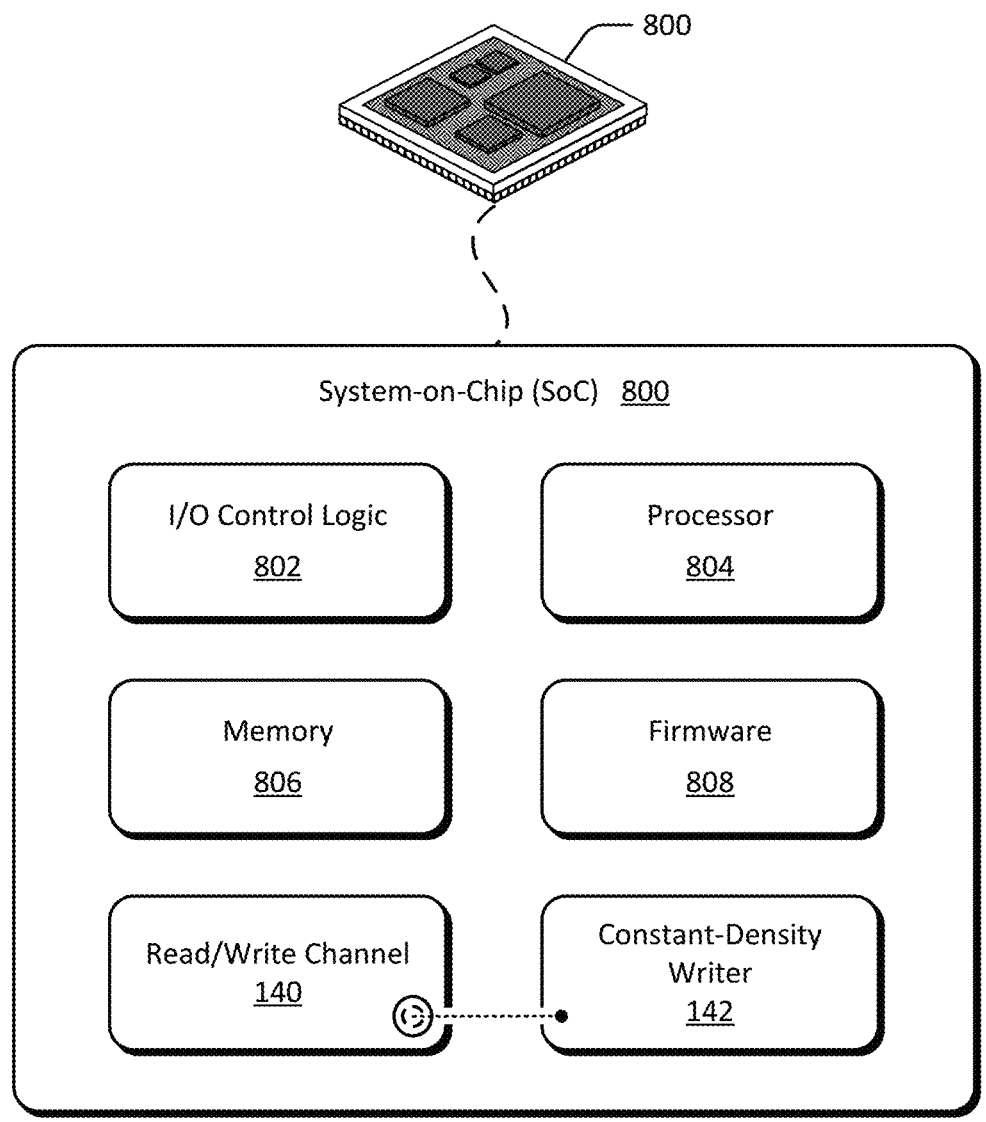
FIG. 8 illustrates an example System-on-Chip (SoC) environment for implementing aspects of constant-density writing for the magnetic storage media of FIG. 2.

FIG. 8 illustrates an exemplary System-on-Chip (SoC) 800 that implements various aspects of constant-density writing for magnetic storage media. The SoC 800 is implemented in any suitable device, such as a smartphone, netbook, tablet computer, access point, network-attached storage, camera, smart appliance, printer, set-top box, server, solid-state drive (SSD), magnetic tape drive, hard-disk drive (HDD), storage drive array, memory module, storage media controller, storage media interface, head-disk assembly, magnetic media pre-amplifier, automotive computing system, or any other suitable type of device (e.g., others described herein). Although described with reference to a SoC, the entities of FIG. 8 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 800 may be integrated with electronic circuitry, a microprocessor, memory, input-output (I/O) control logic, communication interfaces, firmware, and/or software useful to provide functionalities of a computing device or magnetic storage system, such as any of the devices or components described herein (e.g., hard-disk drive). The SoC 800 may also include an integrated data bus or interconnect fabric (not shown) that couples the various components of the SoC for data communication or routing between the components. The integrated data bus, interconnect fabric, or other components of the SoC 800 may be exposed or accessed through an external port, parallel data interface, serial data interface, peripheral component interface, or any other suitable data interface. For example, the components of the SoC 800 may access or control external storage media or magnetic write circuitry through an external interface or off-chip data interface.

In this example, the SoC 800 is shown with various components that include input-output (I/O) control logic 802 and a hardware-based processor 804 (processor 804), such as a microprocessor, processor core, application processor, DSP, or the like. The SoC 800 also includes memory 806, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 804 and code (e.g., firmware) stored on the memory 806 are implemented as a storage media controller or as part of a storage media interface to provide various functionalities associated with pulse-based writing for magnetic storage media. In the context of this disclosure, the memory 806 stores data, code, instructions, or other information via non-transitory signals, and does not include carrier waves or transitory signals. Alternately or additionally, SoC 800 includes a data interface (not shown) for accessing additional or expandable off-chip storage media, such as magnetic memory or solid-state memory (e.g., Flash or NAND memory).

The SoC 800 also includes firmware 808, applications, programs, software, and/or operating system, which may be embodied as processor-executable instructions maintained on the memory 806 for execution by the processor 804 to implement functionalities of the SoC 800. The SoC 800 may also include other communication interfaces, such as a transceiver interface for controlling or communicating with components of a local on-chip (not shown) or off-chip communication transceiver. Alternatively or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 800. For example, the SoC 800 includes a transceiver interface configured to enable storage over a wired or wireless network, such as to provide a network-attached storage (NAS) device with pulse-based writing features.

The SoC 800 also includes a read/write channel 140 and a constant-density writer 142, which may be implemented separately as shown or combined with a storage component or data interface. Alternatively or additionally, the SoC 800 may include interfaces to a pre-amplifier and spindle/motor assembly of a magnetic media disk drive. As described herein, the constant-density writer 142 may insert phase delays between bit transitions to implement aspects of constant-density writing for magnetic storage media. Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIG. 2, and/or FIG. 3. The constant-density writer 142, either in whole or part, may be implemented as digital logic, circuitry, and/or processor-executable instructions maintained by the memory 806 and executed by the processor 804 to implement various aspects or features of constant-density writing for magnetic storage media.

The constant-density writer 142 may be implemented independently or in combination with any suitable component or circuitry to implement aspects described herein. For example, a constant-density writer 142 may be implemented as part of a DSP, processor/storage bridge, I/O bridge, graphics processing unit, memory controller, storage controller, arithmetic logic unit (ALU), or the like. The constant-density writer 142 may also be provided integral with other entities of SoC 800, such as integrated with the processor 804, memory 806, a storage media interface, or firmware 808 of the SoC 800. Alternatively or additionally, the constant-density writer 142, and/or other components of the SoC 800 may be implemented as hardware, firmware, fixed logic circuitry, or any combination thereof.

Figure 9:
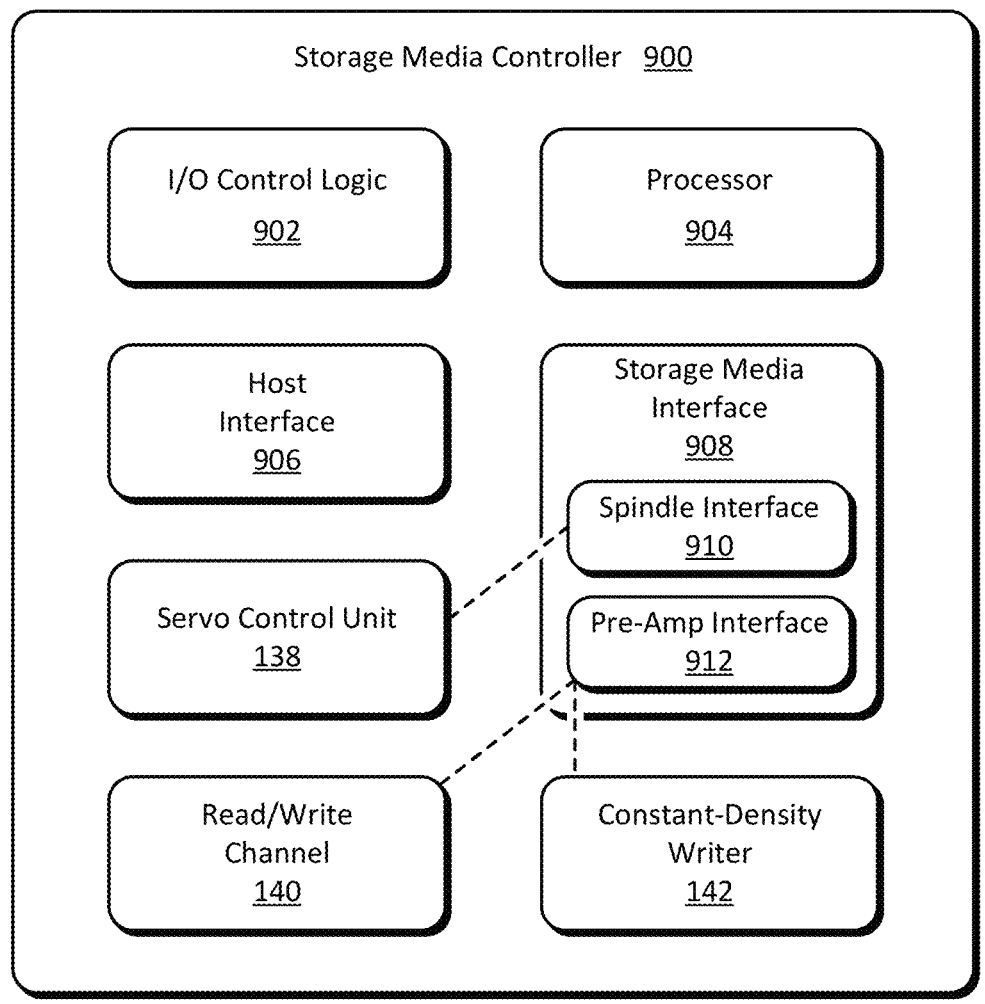
FIG. 9 illustrates an example storage media controller configured to implement aspects of constant-density writing in the magnetic media of FIG. 2 with which the controller is associated.

As another example, consider FIG. 9 which illustrates an example storage media controller 900 in accordance with one or more aspects of pulse-based writing for magnetic storage media. Generally, the storage media controller 900 enables the computing device 102 to access contents of magnetic storage media, such as an operating system, applications, or data for applications or other services. The storage media controller also writes and reads data of the computing device 102 to and from the magnetic storage media with which the controller is associated.

In various aspects, the storage media controller 900 or any combination of components thereof may be implemented as a storage drive controller (e.g., HDD controller or HDD chipset), storage media controller, NAS controller, storage media interface, storage media endpoint, storage media target, or a storage aggregation controller for magnetic storage media, solid-state storage media, or the like (e.g., hybrid SSD/HDD storage systems). In some cases, the storage media controller 900 is implemented similar to or with components of the SoC 800 as described with reference to FIG. 8. In other words, an instance of the SoC 800 may be configured as a storage media controller, such as the storage media controller 900 to manage magnetic storage media. In this example, the storage media controller 900 includes input-output (I/O) control logic 902 and a processor 904, such as a microprocessor, microcontroller, processor core, application processor, DSP, or the like. The storage media controller 900 also includes a host interface 906 (e.g., SATA, PCIe, NVMe, or Fabric interface) and a storage media interface 908 (e.g., magnetic media interface or head-disk assembly (HDA) interface), which enable access to a host system (or fabric) and storage media, respectively. In this example, the storage media interface 908 includes separate instances of a spindle interface 910 and a pre-amp interface 912, such as to enable communication with a head-disk assembly of a media drive.

In some aspects, the storage media controller 900 implements aspects of constant-density writing for magnetic storage media when managing or enabling access to storage media that is coupled to the storage media interface 908. The storage media controller 900 provides a storage interface for a host system via the host interface 906, through which storage access commands, such as data to write to the magnetic storage media are received from the host system. As shown in FIG. 9, the storage media controller 900 also includes a servo control unit 138, read/write channel 140, and a constant-density writer 142. The servo control unit 138 is operably coupled to the spindle interface 910 and provides spindle or voice coil control for a magnetic media drive. In this example the read/write channel 140 and constant-density writer 142 are operably coupled to the pre-amp interface 912 and provide phase-delayed write data 306 and/or pulse-writing control signals to pre-amplifier circuitry of the media drive. In some aspects, the processor 904 and firmware or logic of the storage media controller 900 are implemented to provide various data writing or processing functionalities associated with pulse-based writing for magnetic storage media.

The constant-density writer 142 of the storage media controller 900 may be implemented separately as shown or combined with the processor 904, read/write channel 140, or storage media interface 908. In accordance with various aspects, the constant-density writer 142 inserts phase delays between bit transitions to implement aspects of constant-density writing for magnetic storage media. Examples of these components and/or entities, or corresponding functionality, are described with reference to the respective components or entities of the environment 100 of FIG. 1 or respective configurations illustrated in FIG. 2 and/or FIG. 3. The constant-density writer 142, either in whole or part, may be implemented as processor-executable instructions maintained by memory of the controller and executed by the processor 904 to implement various aspects and/or features of pulse-based writing for magnetic storage media.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. A method for constant-density writing to magnetic storage media, the method comprising:
   accepting write data from a host, the write data having an initial bit period associated with a period of a clock signal, the period of the clock signal being fixed according to an angular velocity of a disk of the magnetic storage media;
   determining respective bit periods for ones of multiple concentric tracks of a disk of magnetic storage media, each bit period of the respective bit periods associated with a particular concentric track of the multiple concentric tracks, the respective bit periods representing periods of time that vary based on respective radiuses of the multiple concentric tracks; the respective bit periods being configured to maintain a particular bit density across the multiple concentric tracks;
   selecting, for the write data, a concentric track from among the multiple concentric tracks, the concentric track being associated with a bit period of the respective bit periods;
   prior to writing along the concentric track, generating phase-delayed write data by delaying transitions between bits of the write data according to the bit period associated with the concentric track, the delaying of the transitions being effective to cause bits of the phase-delayed write data to have the bit period associated with the concentric track, the bit period associated with the concentric track being different than the initial bit period associated with the clock signal; and
   writing the bits of the phase-delayed write data along the concentric track such that the concentric track has the particular bit density.

2. The method of claim 1, wherein the respective bit periods associated with the multiple concentric tracks are greater than or equal to the initial bit period.

3. The method of claim 2, further comprising:
   defining phases of the clock period, the phases including a first phase and a second phase, wherein:
   the clock signal includes a first clock period and a second clock period;
   the bits of the phase-delayed write data include a first bit, a second bit, and a third bit; and
   the delaying of the transitions causes a transition between the first bit and the second bit to occur at the first phase of the first clock period and causes another transition between the second bit and the third bit to occur at the second phase of the second clock period.

4. The method of claim 3, wherein:
   the first clock period and the second clock period are consecutive clock periods of the clock signal; or
   the first clock period is separated from the second clock period by one or more other clock periods of the clock signal.

5. The method of claim 1, wherein a duration of the bit period associated with the concentric track is equal to a summation of an integer multiple of a duration of the clock period and a fraction of the duration of the clock signal.

6. The method of claim 1, further comprising:
   prior to generating the phase-delayed write data, generating initial phase data based on the bit period and the write data, the initial phase data indicating starting phases of the bits within the write data based on phases of a clock period; and
   generating stretched write data based on the initial phase data by inserting at least one stretch bit between a first bit of the bits of the write data and a second bit of the bits of the write data, the inserting of the at least one stretch bit effective to shift the starting phase of the second bit by a multiple of the clock period,
   wherein the delaying of the transitions between the bits of the write data comprises delaying transitions between bits of the stretched write data based on the initial phase data.

7. The method of claim 6, further comprising:
   prior to generating the phase-delayed write data, generating filtered write data by filtering single-bit transitions within the bits of the stretched write data,
   wherein the delaying the transitions between the bits of the stretched write data comprises delaying transitions between bits of the filtered write data based on the initial phase data.

8. The method of claim 1, further comprising:
   determining respective starting phases of the ones of the concentric track, each starting phase of the respective starting phases associated with another particular concentric track of the multiple concentric tracks; the respective starting phases being configured to align bits across the multiple concentric tracks.

9. An apparatus for constant-density writing, the apparatus comprising:
   a disk of magnetic storage media to store write data, the disk including multiple concentric tracks;

an interface to receive the write data from a host, the write data having an initial bit period associated with a period of a clock signal, the period of the clock signal being fixed according to an angular velocity of the disk of magnetic storage media;

a magnetic media writer configured to write phase-delayed write data to the magnetic storage media as data bits; and a constant-density writer configured to:
 determine respective bit periods for ones of the multiple concentric tracks, each bit period of the respective bit periods associated with a particular concentric track of the multiple concentric tracks, the respective bit periods representing periods of time that vary based on respective radiuses of the multiple concentric tracks; the respective bit periods being configured to maintain a particular bit density across the multiple concentric tracks;
 select, for the write data, a concentric track from among the multiple concentric tracks, the concentric track being associated with a bit period of the respective bit periods;
 generate the phase-delayed write data by delaying transitions between bits of the write data according to the bit period associated with the concentric track, the delaying effective to cause bits of the phase-delayed write data to have the bit period associated with the concentric track, the bit period associated with the concentric track being different than the initial bit period associated with the clock signal; and
 transmit, to the magnetic media writer, the phase-delayed write data to enable the concentric track to have the particular bit density.

10. The apparatus of claim 9, wherein the respective bit periods associated with the multiple concentric tracks are greater than or equal to the initial bit period.

11. The apparatus of claim 10, wherein the constant-density writer is configured to:
 prior to generating the phase-delayed write data, generate initial phase data based on the bit period and the write data, the initial phase data indicating starting phases of the bits within the write data based on phases of the initial bit period;
 generate stretched write data based on the initial phase data by inserting at least one stretch bit between a first bit of the bits of the write data and a second bit of the bits of the write data, the inserting of the at least one stretch bit effective to shift a starting phase of the starting phases that is associated with the second bit by a multiple of the initial bit period; and
 delay transitions between bits of the stretched write data based on the initial phase data.

12. The apparatus of claim 11, wherein the constant-density writer is configured to:
 prior to generating the phase-delayed write data, generate filtered write data by filtering single-bit transitions within the bits of the stretched write data; and
 delay transitions between bits of the filtered write data based on the initial phase data.

13. The apparatus of claim 9, wherein the respective bit periods of two consecutive concentric tracks of the multiple concentric tracks differ by a fraction of a nanosecond.

14. The apparatus of claim 9, wherein:
 the write data includes other write data, the other write data having the initial bit period associated with the period of the clock signal;
 the magnetic media writer is configured to write other phase-delayed write data to the magnetic storage media as other data bits;
 the constant-density writer is configured to:
  select, for the other write data, another concentric track of the multiple concentric tracks, the other concentric track associated with another bit period of the respective bit periods;
  generate the other phase-delayed write data by delaying transitions between bits of the other write data according to the other bit period associated with the other concentric track, the delaying effective to cause bits of the other phase-delayed write data to have the other bit period associated with the other concentric track, the other bit period associated with the other concentric track being different than the initial bit period associated with the clock signal; and
  transmit, to the magnetic media writer, the other phase-delayed write data to enable the other concentric track to have the particular bit density;
 the disk of the magnetic storage media is configured to rotate with an angular velocity while the magnetic media writer writes the write data and the other write data; and
 based on the particular bit density, an effective bit period of the data bits written along the concentric track is approximately equal to an effective bit period of the other data bits written along the other concentric track.

15. A System-on-Chip (SoC) for constant-density writing to magnetic storage media, the SoC comprising:
 an interface to a host from which write data is received for writing to magnetic storage media, the write data having an initial bit period associated with a period of a clock signal, the period of the clock signal being fixed according to an angular velocity of a disk of the magnetic storage media;
 an interface to a media writer of the magnetic storage media; and
 a constant-density writer implemented at least partially in hardware, the constant-density writer configured to:
  determine respective bit periods for ones of the multiple concentric tracks, each bit period of the respective bit periods associated with a particular concentric track of the multiple concentric tracks, the respective bit periods representing periods of time that vary based on respective radiuses of the multiple concentric tracks; the respective bit periods being configured to maintain a particular bit density across the multiple concentric tracks;
  select, for the write data, a concentric track from among the multiple concentric tracks, the concentric track being associated with a bit period of the respective bit periods;
  generating phase-delayed write data by delaying transitions between bits of the write data according to the bit period associated with the concentric track, the delaying of the transitions being effective to cause bits of the phase-delayed write data to have the bit period associated with the concentric track, the bit period associated with the concentric track being different than the initial bit period associated with the clock signal; and
  transmit, to the magnetic media writer, the phase-delayed write data to enable the concentric track to have the particular bit density.

16. The SoC of claim 15, wherein the respective bit periods associated with the multiple concentric tracks are greater than or equal to the initial bit period.

17. The SoC of claim 16, wherein at least one bit period of the respective bit periods is not a multiple of the initial bit period.

18. The SoC of claim 16, wherein the constant-density writer is configured to:
- prior to generating the phase-delayed write data, generate initial phase data based on the bit period and the write data, the initial phase data indicating starting phases of the bits within the write data based on phases of the initial bit period;
- generate stretched write data based on the initial phase data by inserting at least one stretch bit between a first bit of the bits of the write data and a second bit of the bits of the write data, the inserting of the at least one stretch bit effective to shift a starting phase of the starting phases that is associated with the second bit by a multiple of the initial bit period; and
- delay transitions between bits of the stretched write data based on the initial phase data.

19. The SoC of claim 18, wherein the constant-density writer is configured to:
- prior to delaying the transitions, generate filtered write data by filtering single-bit transitions within the bits of the stretched write data; and
- delay transitions between bits of the filtered write data based on the initial phase data.

20. The SoC of claim 15, wherein the respective bit periods of two consecutive concentric tracks of the multiple concentric tracks differ by a fraction of a nanosecond.

* * * * *